(12) United States Patent
Schofield (10) Patent No.: US 8,494,313 B2
(45) Date of Patent: Jul. 23, 2013

(54) MONITORING EDC POLARIZATION INVERSE FILTER COEFFICIENTS TO IDENTIFY REAL-TIME PHYSICAL INTRUSION INTO A CORE OR METRO OPTICAL NETWORK

(75) Inventor: Bruce Schofield, Tyngsboro, MA (US)

(73) Assignee: Rockstar Consortium US LP, Plano, TX (US)

(*) Notice: Subject to any disclaimer, the term of this patent is extended or adjusted under 35 U.S.C. 154(b) by 522 days.

(21) Appl. No.: 12/418,919

(22) Filed: Apr. 6, 2009

(65) Prior Publication Data

US 2010/0254649 A1 Oct. 7, 2010

(51) Int. Cl.
*G02B 6/00* (2006.01)
*H04B 10/06* (2006.01)
*H04B 10/12* (2006.01)
*H04B 10/00* (2006.01)
*H04B 17/00* (2006.01)

(52) U.S. Cl.
USPC ............. 385/11; 398/205; 398/184; 398/152; 398/33

(58) Field of Classification Search
USPC ............... 398/65, 152, 184, 205, 177, 33, 39, 398/40; 385/11
See application file for complete search history.

(56) References Cited

U.S. PATENT DOCUMENTS

| 5,485,296 | A | * | 1/1996 | Healey et al. | 398/40 |
|---|---|---|---|---|---|
| 5,966,224 | A | * | 10/1999 | Hughes et al. | 398/40 |
| 6,552,836 | B2 | * | 4/2003 | Miller | 359/237 |
| 6,600,586 | B1 | | 7/2003 | Hall | |
| 6,727,490 | B2 | * | 4/2004 | Medard et al. | 250/227.11 |
| 6,792,168 | B2 | * | 9/2004 | Lanne et al. | 385/11 |
| 7,016,567 | B2 | * | 3/2006 | Smith et al. | 385/37 |
| 7,095,559 | B2 | * | 8/2006 | Taniguchi et al. | 359/484.05 |
| 7,684,701 | B2 | * | 3/2010 | Yuan et al. | 398/40 |
| 7,974,540 | B2 | * | 7/2011 | Tomita et al. | 398/152 |
| 2002/0122220 | A1 | * | 9/2002 | Robinson et al. | 359/110 |
| 2003/0118263 | A1 | | 6/2003 | Phua et al. | |

(Continued)

FOREIGN PATENT DOCUMENTS

| CN | 201032465 | 3/2008 |
|---|---|---|
| CN | 101216149 | 7/2008 |
| CN | 101266024 | 9/2008 |
| WO | 2008027257 A2 | 3/2008 |

OTHER PUBLICATIONS

International Search Report and Written Opinion for PCT/US2010/030051 dated Jun. 7, 2010; 6 pages.

(Continued)

*Primary Examiner* — Kenneth N Vanderpuye
*Assistant Examiner* — Abbas H Alagheband
(74) *Attorney, Agent, or Firm* — Guerin & Rodriguez, LLP (57) ABSTRACT

A fiber network is monitored in order to detect physical intrusion. The state of polarization of an optical fiber is monitored. A fiber tap is determined to have occurred if the state of polarization of the fiber changes beyond a predetermined amount found to be associated with all types of fiber taps. Alternately, it may be determined that a fiber tap has occurred if the state of polarization changes beyond a second predetermined amount and in a predetermined direction. Monitoring of the state of polarization occurs before and after a time period chosen to be less than a time during which the state of polarization of the optical fiber is expected to drift. This step eliminates false positives due to natural fiber PMD drift.

9 Claims, 9 Drawing Sheets

U.S. PATENT DOCUMENTS

| | | | |
|---|---|---|---|
| 2004/0047535 | A1 | 3/2004 | Ukrainczyk |
| 2004/0120629 | A1* | 6/2004 | Han et al. ............... 385/11 |
| 2005/0276611 | A1* | 12/2005 | Patel et al. ............ 398/152 |
| 2006/0072922 | A1* | 4/2006 | MacDonald et al. ...... 398/152 |
| 2006/0153491 | A1* | 7/2006 | Murphy et al. ............ 385/13 |
| 2006/0291795 | A1 | 12/2006 | Murphy et al. |
| 2007/0069893 | A1* | 3/2007 | Anderson ............... 340/541 |
| 2007/0196058 | A1 | 8/2007 | Lee et al. |
| 2007/0253662 | A1 | 11/2007 | Patel et al. |
| 2007/0274712 | A1 | 11/2007 | Leppla et al. |
| 2008/0062407 | A1* | 3/2008 | Boroditsky et al. ........ 356/73.1 |

OTHER PUBLICATIONS

Extended European Search Report dated Dec. 4, 2012 issued by the European Patent Office in corresponding EP Application No. 10762287.0; 6 pages.

First Office Action in related Chinese patent application No. 201080015289.4, mailed on Jan. 30, 2013; 18 pages.

* cited by examiner

Figure 1

Poincare Sphere - Rotations caused by
Bend Method Fiber Tap - 2.4 radians, > 90degrees

Figure 2

Poincare Sphere - Rotations caused by fiber manipulation - .8 radians

| Monitor window (minutes) | Drift time (hr) | 1 | 2.3 | 2.75 |
|---|---|---|---|---|
| 30 | Mean number of false positives (/day) | 21 | 2 | 0.9 |
| 10 | Mean number of false positives (/day) | 0.2 | <0.02 | <0.02 |

MONITORING EDC POLARIZATION INVERSE FILTER COEFFICIENTS TO IDENTIFY REAL-TIME PHYSICAL INTRUSION INTO A CORE OR METRO OPTICAL NETWORK

FIELD OF THE INVENTION

The present invention relates generally to detection of fiber taps in optical networks. More particularly, the invention relates to monitoring fiber dispersion modes to detect fiber taps.

BACKGROUND

Creating a comprehensive security strategy for networks is a multifaceted problem requiring protection techniques at a number of different layers of the network. Physical intrusion at layer 0 of the network—for example the optical fibers that carry the signals in an optical network—can not always be effectively dealt with at higher layers. For example; some encryption techniques are inadequate; sometimes only data is encrypted leaving source and destination addresses exposed. Even traffic level monitoring can be analyzed to reveal important information about real time events. Additionally, jamming or denials of service techniques are harder to stop once an intruder has access to the fiber. Though a large range of possible solutions has been investigated over the past few years, from quantum physics to artificial intelligence processing, no simple, effective mechanism exists today to automatically detect physical fiber intrusion.

SUMMARY

In accordance with the invention, there is provided a relatively low cost and relatively simple approach that can automatically detect any real time attempted tapping of a fiber link by monitoring polarization changes of the fiber.

A method of the invention includes the steps of monitoring the state of polarization of an optical fiber, and determining that a fiber tap has occurred if the state of polarization changes beyond a first predetermined amount. The method can further include the step of determining, alternately, that a fiber tap has occurred if the state of polarization changes beyond a second predetermined amount and in an approximately continuous, non-random direction. More particularly, the step of monitoring includes the steps of monitoring a first state of polarization of an optical fiber; waiting for a time period; and monitoring a second state of the polarization of the optical fiber. The step of determining includes determining that a fiber tap has occurred if the second state of polarization changes beyond a first predetermined amount from the first state of polarization. The time period is chosen to be less than a time during which the state of polarization of the optical fiber is expected to drift. This step eliminates false positives due to natural fiber PMD drift. The first predetermined amount is approximately 2.4 radians, as this has been shown to be the minimal polarization rotation caused by a fiber tap.

Apparatus of the invention includes logic for monitoring the state of polarization of an optical fiber, and logic for determining that a fiber tap has occurred if the state of polarization changes beyond a first predetermined amount. The apparatus can further include logic for determining, alternately, that a fiber tap has occurred if the state of polarization changes beyond a second predetermined amount and in an approximately continuous, non-random direction. More particularly, logic for monitoring includes the logic for monitoring a first state of polarization of an optical fiber; logic for waiting for a time period; and logic for monitoring a second state of the polarization of the optical fiber.

The logic for determining includes logic for determining that a fiber tap has occurred if the second state of polarization changes beyond a first predetermined amount from the first state of polarization. The time period is chosen to be less than a time during which the state of polarization of the optical fiber is expected to drift. This step eliminates false positives due to natural fiber PMD drift. The first predetermined amount is approximately 2.4 radians, as this has been shown to be the minimal polarization rotation caused by a fiber tap.

A program product of the invention is embodied by a computer readable medium having embodied therein a computer program for storing data. The computer program includes logic for monitoring the state of polarization of an optical fiber, and logic for determining that a fiber tap has occurred if the state of polarization changes beyond a first predetermined amount. The program product can further include logic for determining, alternately, that a fiber tap has occurred if the state of polarization changes beyond a second predetermined amount and in an approximately continuous, non-random direction. More particularly, logic for monitoring includes the logic for monitoring a first state of polarization of an optical fiber; logic for waiting for a time period; and logic for monitoring a second state of the polarization of the optical fiber.

The logic for determining includes logic for determining that a fiber tap has occurred if the second state of polarization changes beyond a first predetermined amount from the first state of polarization. The time period is chosen to be less than a time during which the state of polarization of the optical fiber is expected to drift. This step eliminates false positives due to natural fiber PMD drift. The first predetermined amount is approximately 2.4 radians, as this has been shown to be the minimal polarization rotation caused by a fiber tap.

BRIEF DESCRIPTION OF THE DRAWINGS

The advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
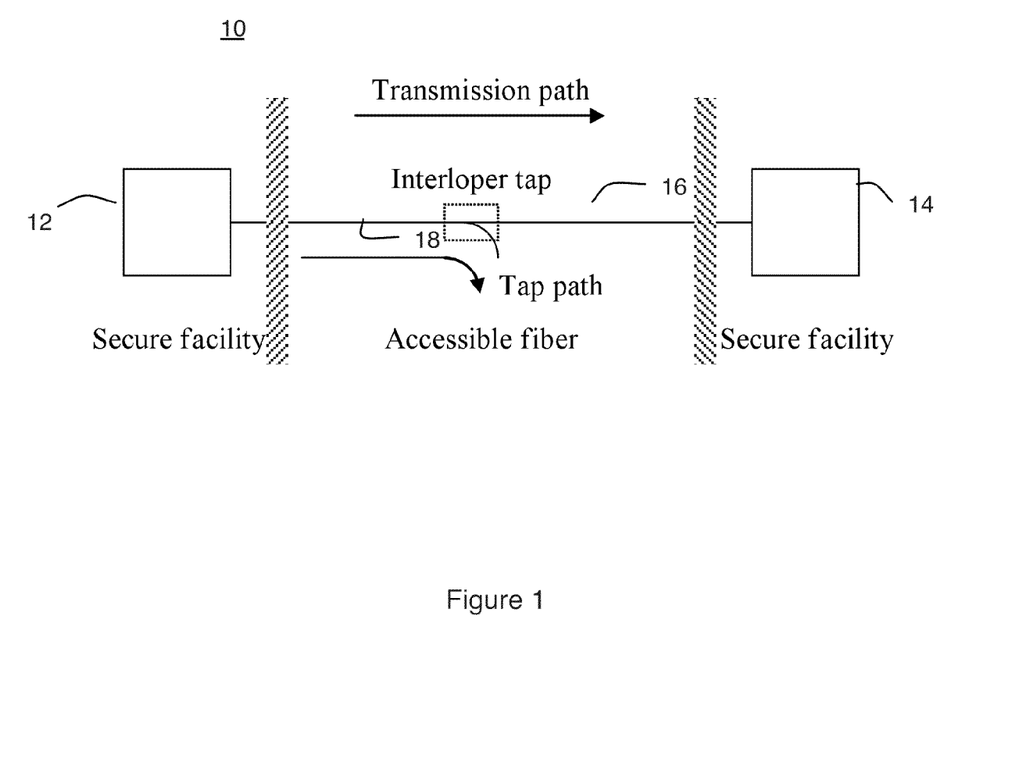
FIG. 1 is a functional block diagram of a fiber network system wherein an interloper attempts to tap the fiber network.

Referring now to FIG. 1, there is shown a system block diagram describing the fiber network system 10 with which the invention operates. Secure facilities 12 and 14, which include transmitters, receivers, amplifiers, etc., are interconnected via a transmission path which is accessible to the public—herein shown as fiber network 16. Fiber network 16 may be for example a phone line, DSL line, TV Cable, data network such as Ethernet, FDDI, TDM such as SONET, WDM, DWDM, etc, any or all of which can be delivering data, video and/or networking services. Fiber network 16 may consist of one or more accessible fibers 18. An interloper attempts to tap an accessible fiber 18 to obtain information about the network.

Interlopers may be trying to gather different information about the network. It is certainly interesting to be able to detect a channel and ascertain the information being transmitted on the channel, particularly in a non-destructive manner. However, simple monitoring of traffic levels, or the very presence or absence of signals themselves, can also be considered interesting information to interlopers. An optical fiber tap can provide any of this information. There are many known methods for tapping an optical fiber via easy to use commercial equipment. Thus, an effective fiber tap detection technique must be able to detect the slightest physical intrusion common to all these techniques.

Various known methods for fiber tapping are herein considered. Bend Induced Coupling is one of the most economical and straightforward methods. Several manufacturers produce devices for controlling bending of the fiber and capturing the light lost from the core in the bend. The bend method is also considered to be one of the methods with the lowest risk, as the optical signal propagating through the fiber to be tapped does not need to be interrupted. Side Polishing is another form of fiber tapping wherein the fiber is carefully polished to remove the cladding from one side of the fiber. Another fiber is then brought into close proximity to the core of the target fiber in order to make an evanescent coupler. Side Polishing takes a skilled technician a long time to accomplish. Index Change is another form of fiber tapping wherein the index of refraction of the core is changed through any of various methods. The core index of refraction can be permanently altered by applying a high-intensity pulsed laser to write a grating on the core. Or, a wedge shape can be cut from the fiber, close enough to the core to disturb the optical field in order to couple light out of the core. Or, a temporary refractive index change can be induced by way of an acousto-optic effect. Another form of fiber tapping is known as a Fused Fiber Coupler. This involves twisting the fibers together, etching the cladding away, and then pulling and heating the fibers to form the coupler. A fiber tap can also be formed by producing a small break in a fiber to cause some the light to propagate across the break into the cladding, producing a fabry-perot cavity. And, it is feasible for a skilled interloper to break and splice a fiber—but this cause blocking of the transmission path for at least several milliseconds, which should cause higher level protocol alarms (e.g. a SONET LoS failover within 50 ms).

The transport fiber can be deployed in various states. The fiber may be buried in protective cabling, under the ground or under the ocean (submarine), or it may be hung from poles (aerial) with minimal environmental protection. Once physical access to the fiber has been obtained, all tapping methods will require fiber manipulation.

What was sought was a way to characterize, measure, and monitor an effect common to all the different types of fiber taps so that a fiber tap can be identified and reported as it occurs. The different types of fiber taps cause various anomalies including insertion loss, polarization dependent loss, and polarization mode dispersion (PMD). In accordance with the invention it has been realized that in order to cause light to escape the fiber to get any type of fiber tap to work, birefringence occurs in the fiber. These birefringences in turn cause a change in the state of polarization (SOP) of the fiber—in particular, polarization rotation occurs. It was realized that the level of birefringence caused by the bending and tapping produces polarization rotations to a degree significant enough to be detected and measured.

PMD is a form of modal dispersion wherein two different polarizations of light travel down a fiber at different speeds. It is typically characterized by a three-component dispersion vector known as a Stokes vector, and is visualized as plotted on the Poincare sphere. Polarization states will be described herein in terms of Stokes vectors and the Poincare sphere.

Figure 2:
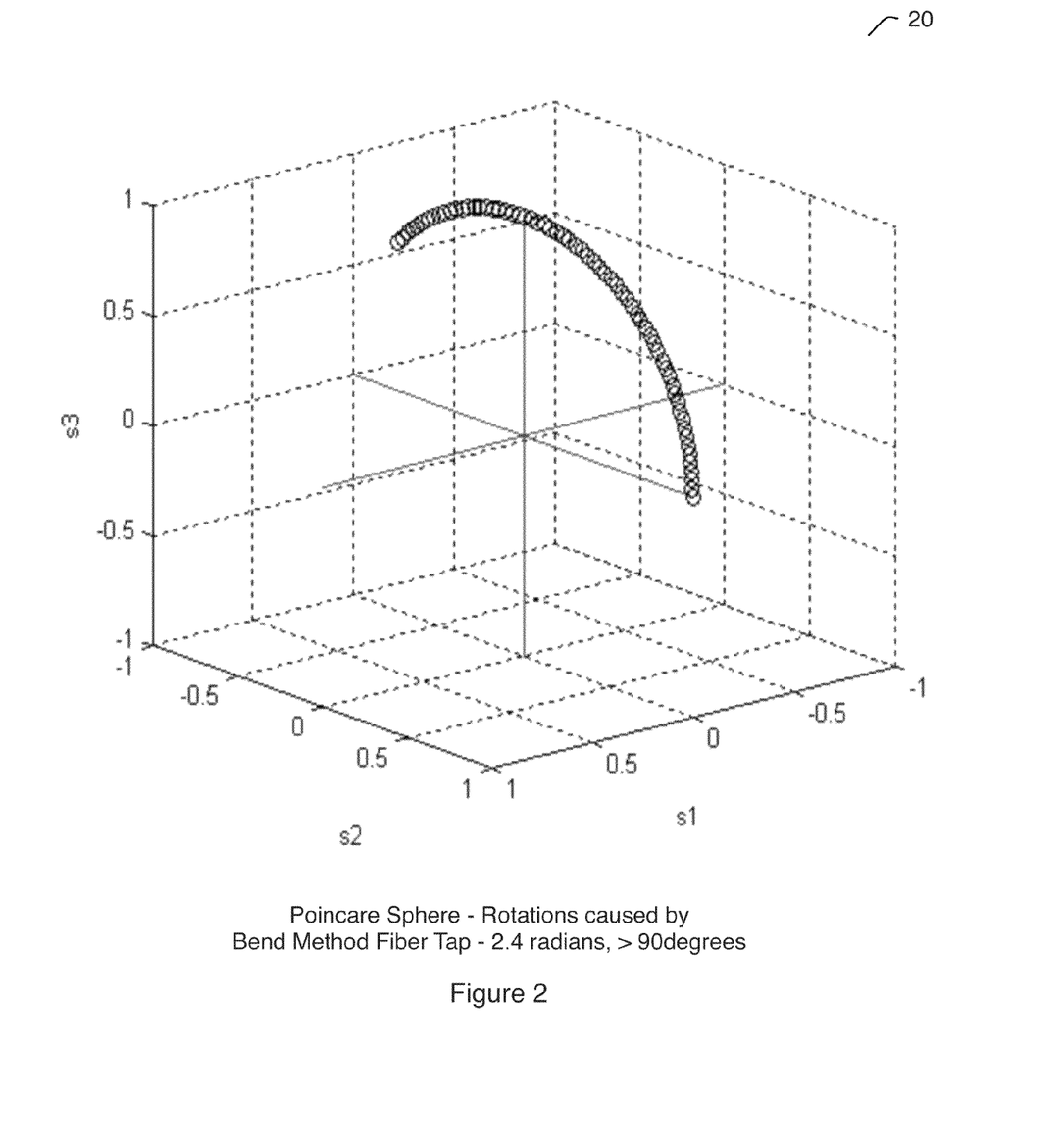
FIG. 2 is a representation of a Poincare Sphere showing the polarization rotations caused by the Bend Method of fiber tapping.
Figure 3:
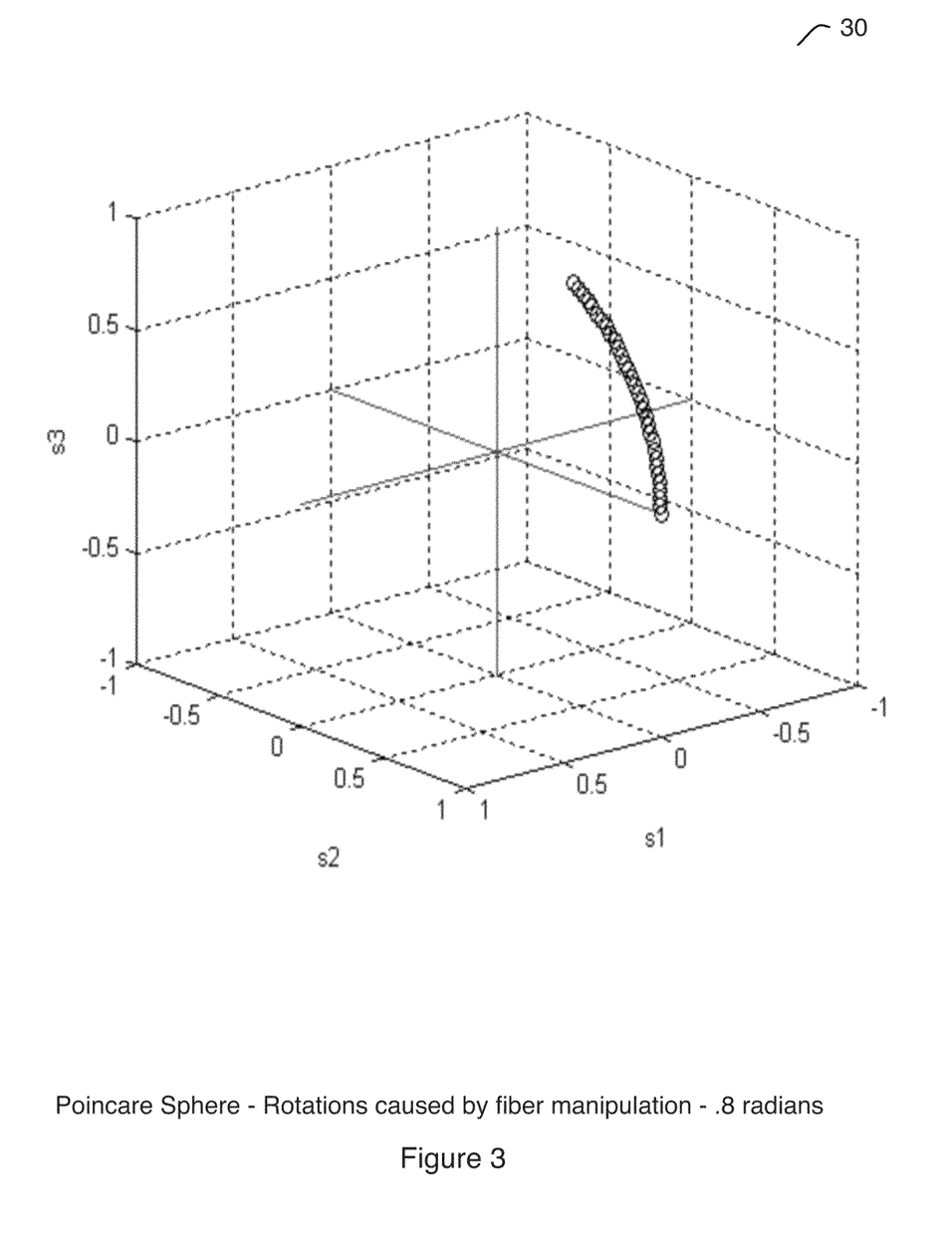
FIG. 3 is a representation of a Poincare Sphere showing the polarization rotations caused by the fiber manipulation that occurs during fiber tapping.

Once it was understood that polarization rotation is the signature of physical intrusion, analytical and experimental investigation was undertaken to ascertain which fiber tap method produced the lowest polarization rotation. If the method producing the lowest polarization rotation produces enough to be detected, then all methods can be detected. It was determined that the Bend Method of fiber tap described above produced the smallest polarization rotation, a minimum of 2.4 radians, as shown on the Poincare sphere plot 20 of FIG. 2. Fiber manipulation in preparation of fiber tapping causes a minimum additional 0.8 radians of polarization rotation, as shown on the Poincare sphere plot 30 of FIG. 3. With the technologies recently available, as will be further described, such polarization rotations are detectable.

Figure 4:
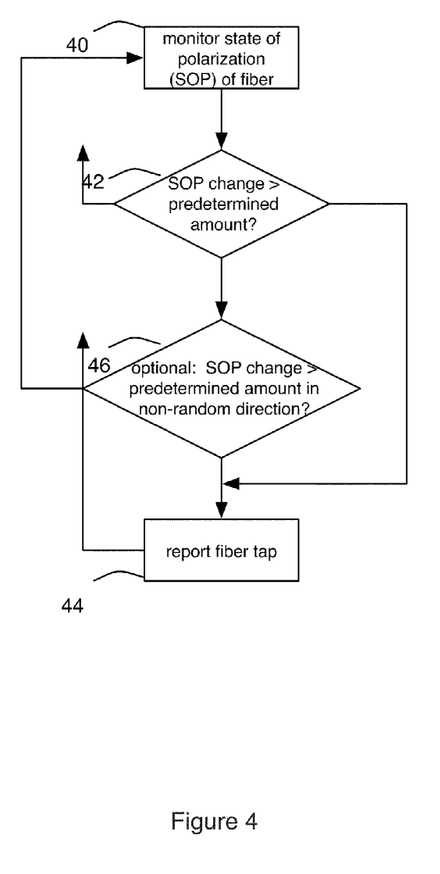
FIG. 4 is a flow diagram of the process of detecting a fiber tap in accordance with the invention.

Thus in accordance with the invention, as shown in FIG. 4, the state of polarization (SOP) of the fiber is monitored (step 40). If the SOP changes by a predetermined amount (step 42), it is determined that a fiber tap has occurred (step 44). More particularly, the SOP is monitored over a time period to see if it rotates over 90 degrees (see FIG. 2) on the Poincare sphere. If so, a fiber tap is indicated.

However, it is also understood that natural PMD drift can occur in fiber networks, so in accordance with the invention, a robust detection system accounts for this natural drift to minimize false positive results.

The properties of transport fiber vary with time. PMD (due to birefringence), PDL, chromatic dispersion, etc. all occur and vary. The variations depend in part on the manner in which the fiber is deployed. For instance, dispersion properties of submarine fiber tend to vary slowly, on the order of months, while dispersion in aerial fiber tends to vary more quickly, on the order of hours, due to wind and temperature change. The magnitude of the drift can be as substantial as the polarization state change caused by a fiber tap, but the drift occurs much more slowly.

Figure 5A:
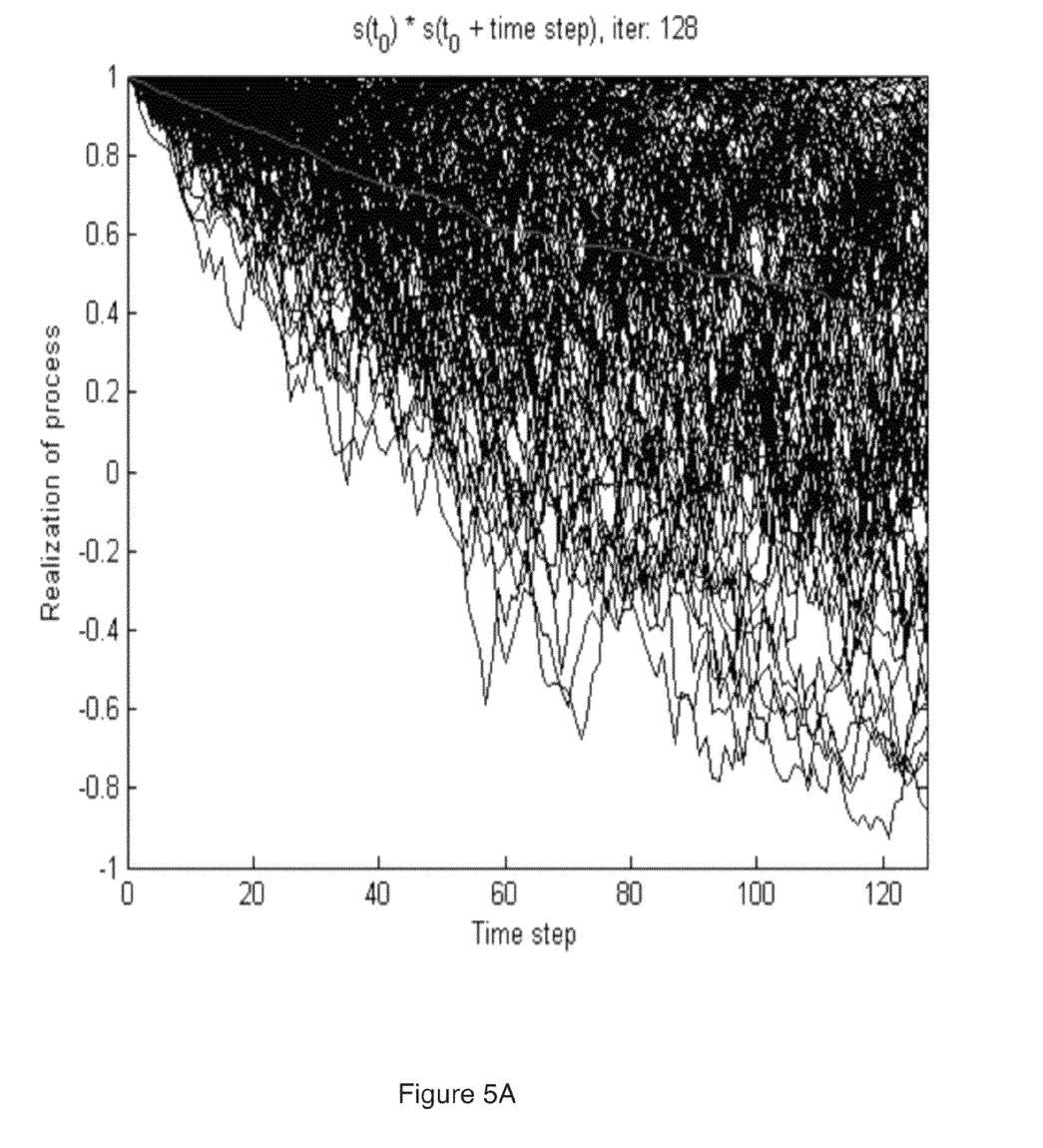
FIG. 5A is a plot of the dot product of stokes vectors vs. time steps for a fiber, showing polarization rotation drift and the randomness thereof.
Figure 5B:
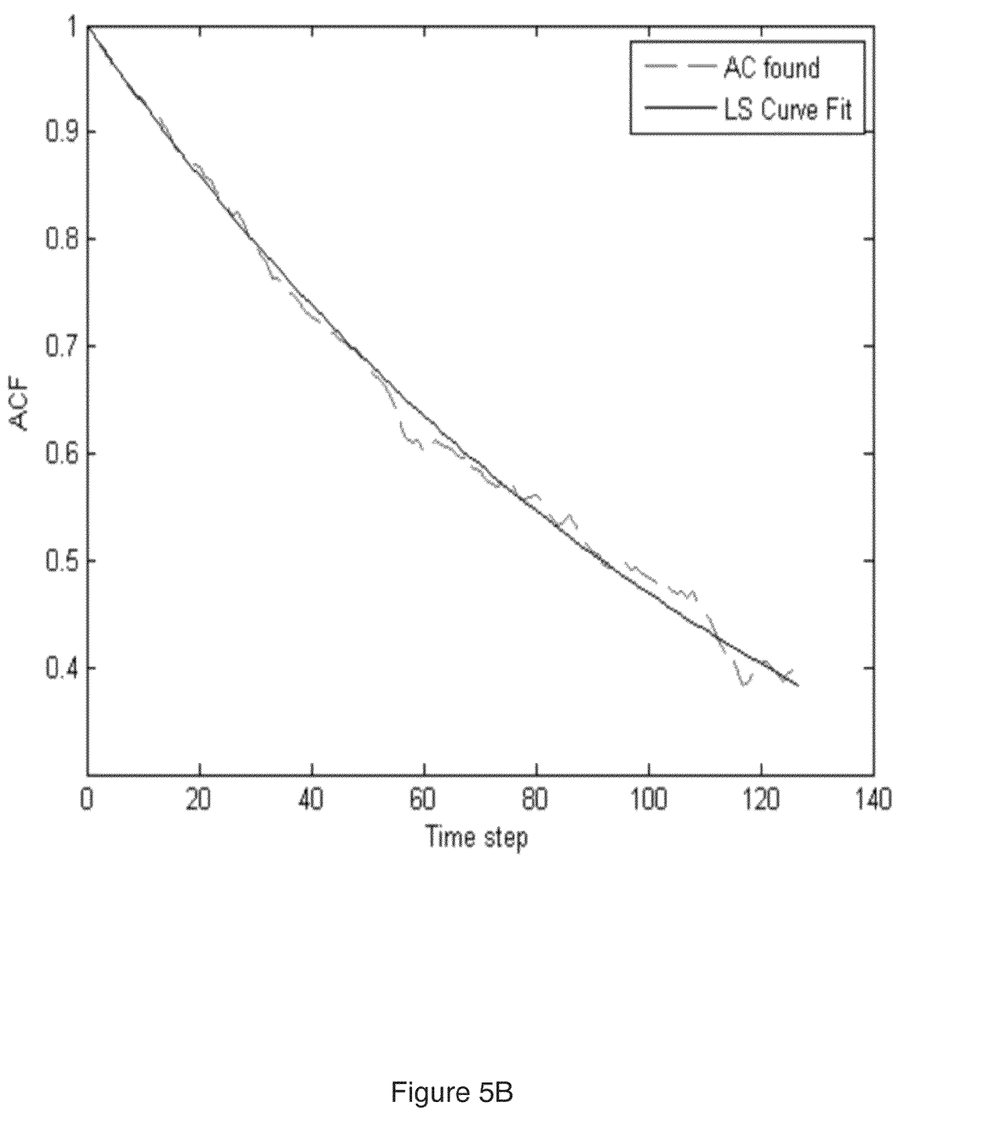
FIG. 5B is a LMS plot of a plot similar to FIG. 5A.

In FIGS. 5A and 5B, there is shown a pair of graphs estimating the amount of drift in fiber. The output state of polarization on the Poincaré sphere is represented by the three element Stokes vector. In a real fiber, the output state of polarization will naturally drift over time. The Stokes vector at some time and the Stokes vector at some later time can be compared by taking the dot product of the two vectors. FIG. 5A shows realizations of this dot product. It can be seen that for a small number of time steps (left side of graph 5A or 5B), the dot product will be close to 1, indicating that the state of polarization in the near future will be similar to the state of polarization now. However, for long enough time, the state of polarization in the future will not be similar to the state of polarization now. This is more clearly seen in the LMS plot of FIG. 5B. It can also be seen that over a small number of time steps, in certain realizations the state of polarization can change but at a much slower rate than that induced by fiber taps. So, in accordance with the invention, if fiber taps are monitored for during a short enough window, polarization rotation due to fiber drift will not cause false positives.

FIG. 5A further demonstrates that the drift in state of polarization that does occur on the fiber is random in nature. In contrast, as can be seen from the Poincaré plots in FIGS. 2 and 3, the change in state of polarization due to a fiber tap changes direction in a continuous manner. The SOP change during a fiber tap does not display the random walk pattern of natural fiber drift. Thus, this is another signature pattern of a fiber tap that can be monitored.

Thus, in further accordance with the invention, as shown in FIG. 4, in addition to monitoring the SOP of the fiber for a minimum change in rotation (step 42), the fiber can be monitored to see if the rotational change is occurring in a continuous direction, in a non-random manner, thus possibly indicating a fiber tap (step 46). In this case, even if a smaller than 90 degree rotational change on the Poincaré sphere is occurring, if it is occurring in a continuous non-random direction of a fiber tap, or within an envelope or window of directional rotational change, then a fiber tap is reported.

Figure 6:
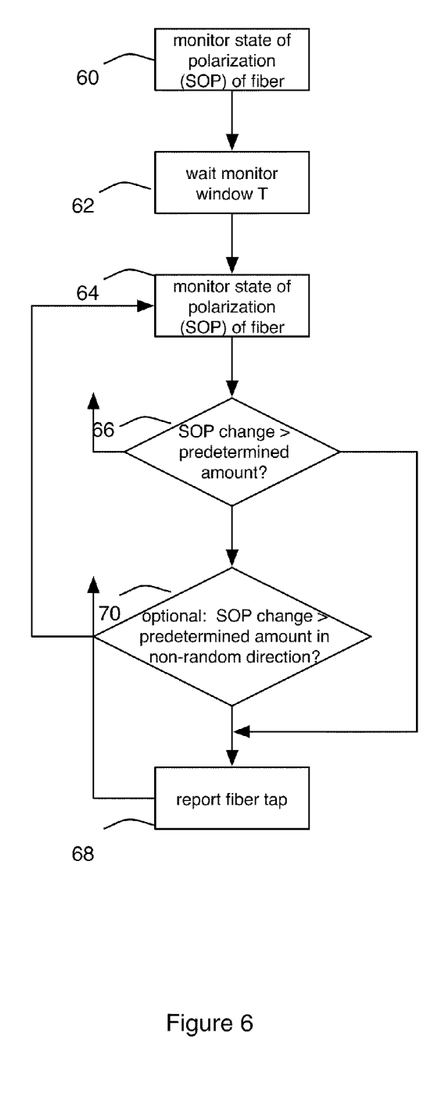
FIG. 6 is a flow diagram of the process of detecting a fiber tap in accordance with the invention.

Also in accordance with the invention, the natural PMD drift of the fiber is accounted for to provide a robust solution. Referring to FIG. 6, the SOP is observed (step 60), and after a monitor window of time T (step 62), it is observed again (step 64). The SOP is compared to the measured SOP from a time T ago, looking to see if a predetermined rotational amount has been exceeded—e.g. for a Poincaré sphere rotation larger than 90 degrees (step 66). If such an SOP change is found, a fiber tap is reported (step 68). Again, a fiber tap can also be reported if a smaller SOP change with proper directionality is found (step 70). The chosen time T limits the probability of false positives. For example, it has been experimentally shown that drift times in real fibers ranges between 5 minutes for aerial fibers to 2 months for submarine fibers.

Figure 7:
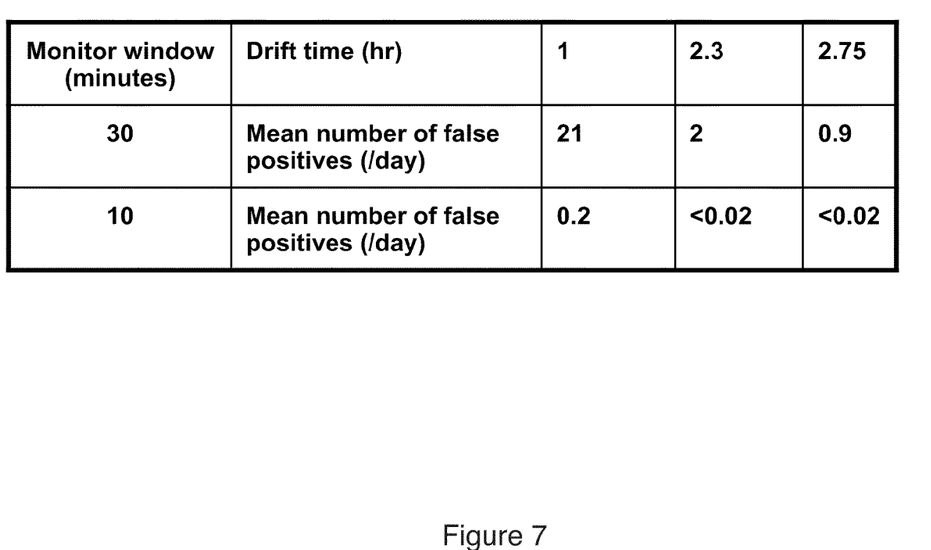
FIG. 7 is a table demonstrating monitor window size effect on false positive results.

Referring to FIG. 7, there is shown an example of two different monitoring window sizes that might be used for an aerial fiber. As the drift time window increases relative to the size of the monitor window, false positives decrease. As can be seen, by lowering the window (T) from 30 minutes to 10 minutes, the number of false positives per day drops from significant to negligible. T can be chosen based on the type of fiber employed. T can be large for a submarine fiber, and smaller for an aerial fiber.

It is understood that, with powerful enough processing, the monitor window T can be reduced to minutes, or seconds.

Figure 8:
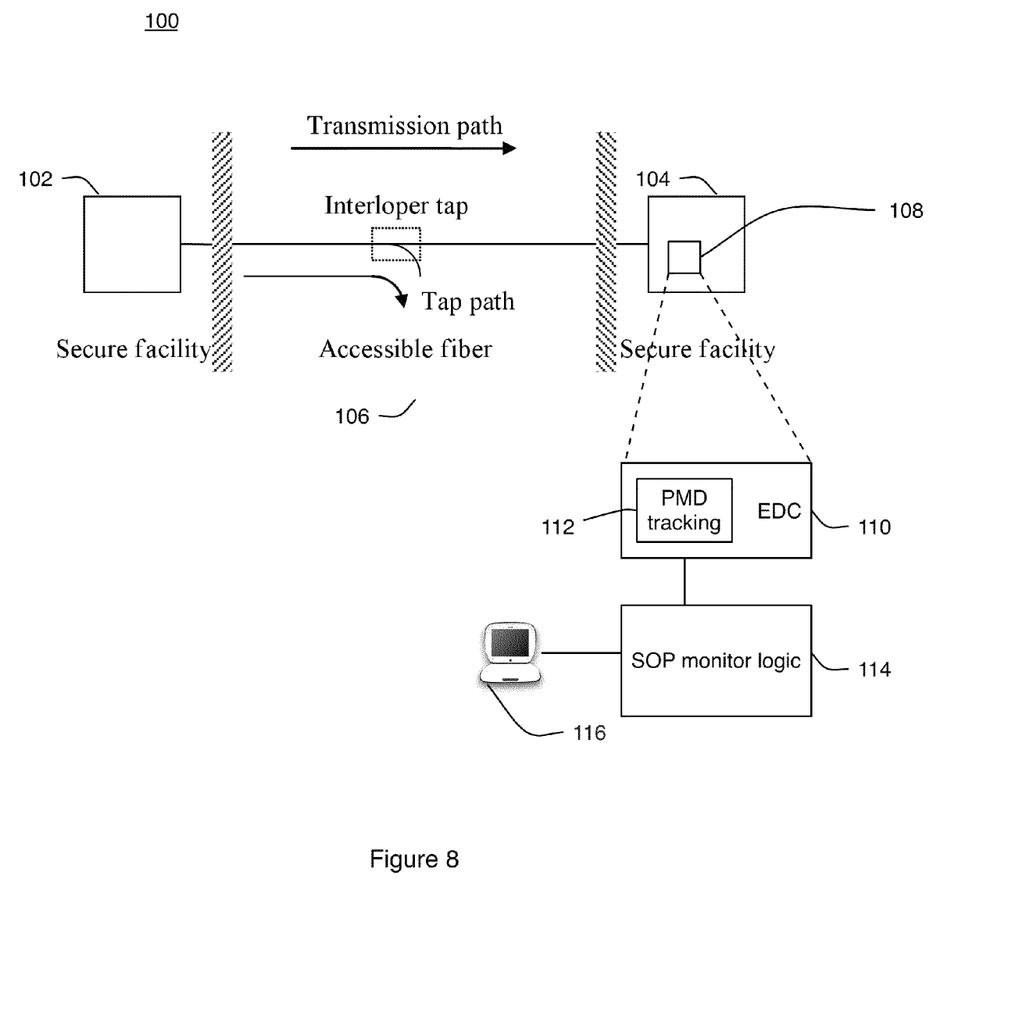
FIG. 8 is a block diagram of a preferred embodiment of the invention.

In accordance with one embodiment of the invention as shown in the system 100 of FIG. 8, electronic dispersion compensation (eDCO) is employed. Electronic dispersion compensation allows the transmitter and receiver to adapt to a dispersive, changing optical channel. The changes may come from the external environment, or may be due to the network design itself. The electronic dispersion compensation used in the system of FIG. 8 tracks polarization mode dispersion, since PMD is known to vary on the fiber over time. Since PMD is already being tracked, the receiver is modified to monitor the eDCO coefficients as they are re-calculated to see if a large change in PMD is being corrected for. The magnitude and direction of PMD change can be inferred from the coefficients. If a sufficiently large magnitude PMD change occurs, a fiber tap is indicated to higher level software 116.

Thus as shown in FIG. 8, secure facilities 102 and 104 are interconnected via fiber network 106. A receiver 108 within secure facility 104 includes eDCO 110 capable of PMD tracking 112. SOP monitor logic 114 implements logic for monitoring the eDCO coefficients as the are re-calculated to see if polarization rotations are occurring to an extent to which a fiber tap should be reported in accordance with the methods of FIGS. 4 and/or 6. Again, if using the method of FIG. 6, the monitor window can be reduced to seconds if the processing power of the DSP or other processor that is re-calculating the coefficients is sufficient.

Figure 9:
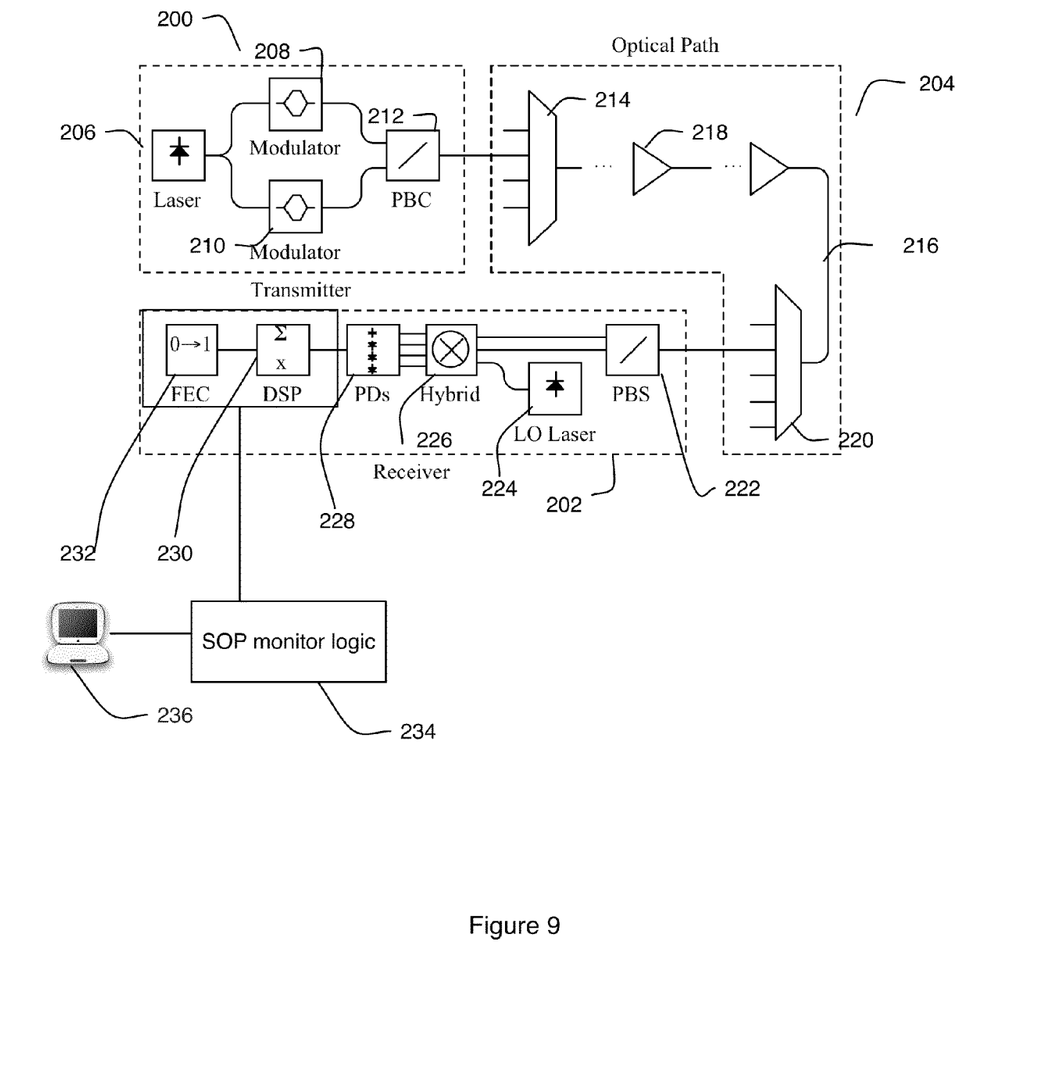
FIG. 9 is a block diagram of a more detailed preferred embodiment of the invention.

A block diagram of the preferred embodiment of the invention is shown in FIG. 9. An optical transmitter 200 and optical receiver 202 are coupled by an optical path 204. The transmitter 200 is a Nortel Networks 40 Gb/s transmitter employing two-polarization QPSK. At the transmitter, the signal from a common laser 206 is split into two paths. Each of the paths is modulated (208, 210) to produce quadrature phase-shift keying (QPSK) modulation. The modulation is done at approximately 10 GSymbols/s. The two paths are combined using a polarization beam combiner (PBC) 212. At the output of the PBC 212 is two-polarization QPSK, with a total bit rate of approximately 40 Gb/s.

The optical path consists of multiplexers 214, transmission fiber 216, amplifiers 218, and de-multiplexers 220. Each of these components causes various impairments which may include polarization rotation, chromatic dispersion (CD) and PMD.

The receiver 202 is a Nortel Networks 40 Gb/s receiver. At the receiver 202, the modulated optical signal is split using a polarization beam splitter 222, and combined with a local oscillator laser 224 using an optical hybrid 226. Following the hybrid 226, the optical signals are detected by photodetectors 228, and then digital signal processing (DSP) 230 is done to compensate for the various optical and electrical impairments [23]. The output of the DSP 230 is further processed by a forward error-correction (FEC) chip 232 to correct errors.

The DSP 230 implements polarization tracking. So, in accordance with the invention, the receiver 202 is modified to include SOP monitor logic 234. SOP monitor logic 234 implements the methods of FIGS. 4 and/or 6 to determine whether the fiber anywhere along the optical path 204 is being tapped by monitoring the change in polarization rotation of the fiber core. The degree of polarization rotation is indicated by tracking eDCO co-efficients from the DSP 230 as they are re-calculated, as described above. If the coefficients indicate that the state of polarization has rotated over 90 degrees, the SOP monitor logic 234 indicates a fiber tap to higher layer monitoring software 236.

However, the invention is not limited to eDCO implementations. it is feasible that other types of transmitters and receivers could be employed without departing from the principles of the invention. Any receiver capable of tracking PMD can be utilized. For example, available PMD monitoring testing devices and tools can be used.

It is also understood that fiber tapping techniques will evolve, and that eventually a fiber tapping technique may exist that causes an SOP change of less than 2.4 radians, or 90 degrees on the Poincare sphere. But some degree of SOP change is nevertheless expected, and such taps will be detectable via the methods of the invention by using different pre-determined limits and sampling intervals.

Furthermore, it is understood that fiber taps can be incurred for purposes other than interloping, and the invention applies to fiber tapping or manipulation for any purpose. For example, a maintenance operation requiring a fiber tap may be ordered on a section of fiber in a metro or core network. These networks can be very large, many kilometers long, and it is important to make sure that expensive maintenance or repair operations occur on the correct spans. The fiber tapping detection mechanism of the invention can be employed along with higher level network monitoring software to ensure, for example, that the maintenance operation is occurring on the correct section of the fiber.

The SOP monitor logic of FIGS. 8 and 9, and methods of FIGS. 4 and 6, can be implemented in hardware or software. The SOP monitoring logic of the present invention can be implemented as a set of computer program instructions that are stored in a computer-readable medium and executed by an embedded microprocessor system, for instance within the receivers of FIG. 8 or 9. Embodiments of the invention may be implemented, in whole or in part, in any conventional computer programming language. For example, preferred embodiments may be implemented in a procedural programming language (for example, "C") or an object oriented programming language (for example, "C++"). Alternative embodiments of the invention may be implemented, in whole or in part, utilizing discrete components, integrated circuitry, programmable logic used in conjunction with a programmable logic device such as a Field Programmable Gate Array (FPGA) or microprocessor, or any other means including any combination thereof. Additional embodiments of the invention may be implemented, in whole or in part, as a computer program product for use with a computer system. Such implementation may include a series of computer instructions fixed either on a tangible medium, such as a computer-readable media (for example, a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Although the invention has been shown and described with reference to specific preferred embodiments, it should be understood by those skilled in the art that various changes in form and detail may be made therein without departing from the spirit and scope of the invention as defined by the following claims.

What is claimed is:

1. A method comprising the steps of:
monitoring a first state of polarization of an optical fiber;
waiting for a time period that is less than a time during which the first state of polarization of the optical fiber is expected to drift;
monitoring a second state of polarization of the optical fiber; and
determining that a fiber tap has occurred if the second state of polarization changes beyond a first predetermined amount from the first state of polarization.

2. The method of claim 1 further comprising the step of:
determining alternately that a fiber tap has occurred if the first state of polarization changes beyond a second predetermined amount and in an approximately continuous, non-random direction.

3. The method of claim 1 wherein the first predetermined amount is approximately 2.4 radians.

4. Apparatus comprising:
logic for monitoring a first state of polarization of an optical fiber:
logic for waiting for a time period that is less than a time during which the first state of polarization of the optical fiber is expected to drift;
logic for monitoring a second state of polarization of the optical fiber; and
logic for determining that a fiber tap has occurred if the second state of polarization changes beyond a first predetermined amount from the first state of polarization.

5. The apparatus of claim 4 further comprising:
logic for determining alternately that a fiber tap has occurred if the first state of polarization changes beyond a second predetermined amount and in an approximately continuous, non-random direction.

6. The apparatus of claim 4 wherein the first predetermined amount is approximately 2.4 radians.

7. A computer program product comprising a non-transitory computer readable medium having embodied therein a computer program for storing data, the computer program comprising:
logic for monitoring a first state of polarization of an optical fiber;
logic for waiting a time period that is less than a time during which the first state of polarization of the optical fiber is expected to drift;
logic for monitoring a second state of polarization of the optical fiber; and
logic for determining that a fiber tap has occurred if the second state of polarization changes beyond a first predetermined amount from the first state of polarization.

8. The program product of claim 7 further comprising:
logic for determining alternately that a fiber tap has occurred if the first state of polarization changes beyond a second predetermined amount and in an approximately continuous, non-random direction.

9. The program product of claim 7 wherein the first predetermined amount is approximately 2.4 radians.

* * * * *